(12) United States Patent
Walker et al.

(10) Patent No.: US 9,731,812 B2
(45) Date of Patent: Aug. 15, 2017

(54) FLAP MECHANISM AND ASSOCIATED METHOD

(71) Applicant: The Boeing Company, Chicago, IL (US)

(72) Inventors: Steven Paul Walker, Arlington, WA (US); Flint Matthew Jamison, Lynnwood, WA (US); Kelly T. Jones, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 65 days.

(21) Appl. No.: 14/605,421

(22) Filed: Jan. 26, 2015

(65) Prior Publication Data

US 2016/0214705 A1 Jul. 28, 2016

(51) Int. Cl.
*B64C 9/16* (2006.01)
*B64C 9/02* (2006.01)

(52) U.S. Cl.
CPC . *B64C 9/16* (2013.01); *B64C 9/02* (2013.01)

(58) Field of Classification Search
CPC .. B64C 13/28; B64C 9/04; B64C 9/18; B64C 9/16; B64C 3/48
See application file for complete search history.

(56) References Cited

U.S. PATENT DOCUMENTS

| 3,987,983 | A | | 10/1976 | Cole | |
|---|---|---|---|---|---|
| 4,053,124 | A | * | 10/1977 | Cole | B64C 3/48 244/215 |
| 4,120,470 | A | | 10/1978 | Whitener | |
| 4,434,959 | A | | 3/1984 | Rudolph | |
| 4,471,928 | A | | 9/1984 | Cole | |
| 4,542,869 | A | | 9/1985 | Brine | |
| 4,605,187 | A | * | 8/1986 | Stephenson | B64C 9/04 244/216 |
| 4,669,687 | A | | 6/1987 | Rudolph | |
| 4,702,442 | A | * | 10/1987 | Weiland | B64C 9/16 244/216 |
| RE32,907 | E | | 4/1989 | Rudolph | |
| 8,684,316 | B2 | | 4/2014 | Sakurai et al. | |
| 8,763,953 | B2 | | 7/2014 | Sakurai et al. | |
| 2010/0286849 | A1 | | 11/2010 | Huynh et al. | |
| 2011/0017876 | A1 | * | 1/2011 | Manley | B64C 3/48 244/219 |
| 2012/0012696 | A1 | | 1/2012 | Sakurai et al. | |
| 2013/0075537 | A1 | | 3/2013 | Sakurai et al. | |

* cited by examiner

*Primary Examiner* — Valentina Xavier
(74) *Attorney, Agent, or Firm* — Alston & Bird LLP (57) ABSTRACT

An airfoil, a flap mechanism and an associated method are provided to controllably actuate a flap positioned proximate the trailing edge of an airfoil body. The flap mechanism includes a carrier beam hingedly connected to an airfoil body and also pivotally connected to a flap proximate the trailing edge of the airfoil body. The flap mechanism further includes an actuator, a first plurality of links and a second plurality of links. The first plurality of links is operably connected to the airfoil body, the actuator and the carrier beam. The first plurality of links causes the carrier beam to be rotated with respect to the airfoil body in response to actuation by the actuator. The second plurality of links is responsive to rotation of the carrier beam with respect to the airfoil body. The second plurality of links causes the flap to be rotated with respect to the carrier beam.

20 Claims, 6 Drawing Sheets

FLAP MECHANISM AND ASSOCIATED METHOD

TECHNOLOGICAL FIELD

An example embodiment relates generally to an airfoil, a flap mechanism and an associated method for actuating a flap proximate a trailing edge of an airfoil body.

BACKGROUND

Airfoils are utilized for a variety of purposes. For example, aircraft include airfoils in the form of wings that, among other functions, provide lift for the aircraft. Airfoils, such as wings, may include flaps that are configured to be repositioned in order to alter the aerodynamic performance of the airfoil. For example, a wing may include a flap positioned along its trailing edge. During the cruise phase of a flight, the flap may be positioned so as to provide a relatively continuous surface with the remainder of the airfoil body. However, the flap may be deployed by being rotated downwardly in other phases of the flight, such as during takeoff and landing, in order to alter the aerodynamic performance of the wing.

Wings may be formed of wing panels. At least some wing panels are formed of a composite material, such as a carbon fiber composite material. Wing panels formed of a composite material may support significantly higher fatigue stresses, thereby permitting the depth, e.g., thickness, of the wing to be substantially reduced. Additionally, wings have tended to become more aft-loaded. Thus, the trailing edge device loads and the forces required to actuate flaps along the trailing edge of a wing have not experienced a linear increase as aircraft design has evolved, but, instead, the trailing edge device loads and the forces required to actuate trailing edge flaps have been more greatly multiplied as the result of the decrease in the depth of the wing and the trend towards more aft-loaded wings.

Flap support mechanisms, such as cantilevered steel tracks or truss mechanisms, configured to controllably position the flap relative to the remainder of the airfoil body have generally resolved the bending moment of the cantilevered flap as a vertical couple. The vertical couple acts at the rear spar and at a tension fitting forward of the rear spar. In many instances, the flap support mechanism is fairly substantial in order to accommodate the increases in the trailing edge device loads and the forces required to actuate trailing edge flaps such that the flap support mechanism extends underwing by a substantial distance. The wing may include a fairing to house the flap support mechanism that correspondingly protrudes a substantial distance underwing, thereby impacting the aerodynamic performance of the wing.

The wings of some aircraft utilize a drooped hinge. A drooped hinge utilizes a fixed underwing beam to create a pivot point and an actuator arm to push the trailing edge flap in the aft direction. This mechanism partially resolves the cantilever moment as a horizontal couple, rather than a vertical couple. However, this mechanism generally requires greater actuation forces as a result of the shorter moment arm. Additionally, this mechanism resolves the cantilever moment from the hinge point as a vertical couple with the underwing beam.

BRIEF SUMMARY

An airfoil, a flap mechanism and an associated method are provided in accordance with an example embodiment in order to controllably actuate a flap positioned proximate the trailing edge of an airfoil body. In an example embodiment, the flap mechanism and associated method are configured to provide for controlled actuation of the flap while reducing the size of the flap mechanism that extends beyond the airfoil. Additionally or alternatively, the flap mechanism and associated method of an example embodiment are configured to provide for controlled actuation of a flap in a manner that allows for the actuator to be unloaded, both in an instance in which the flap is in an undeployed position, such as during the cruise phase of a flight, and in a deployed position, such as during the takeoff and/or landing phases of a flight. As a result, the lifetime of the actuator may, in some instances, be extended.

In an example embodiment, an airfoil is provided that includes an airfoil body defining an internal cavity, a flap proximate a trailing edge of the airfoil body and a flap mechanism configured to controllably position the flap relative to the airfoil body. The flap mechanism includes a carrier beam hingedly connected to the airfoil body and also pivotally connected to the flap. The flap mechanism further includes an actuator disposed within the internal cavity. Further, the flap mechanism includes a first plurality of links operably connected to the airfoil body, the actuator and the carrier beam. The first plurality of links is configured to cause the carrier beam to be rotated with respect to the airfoil body in response to actuation by the actuator. The flap mechanism additionally includes a second plurality of links, such as a scissors mechanism, that are responsive to rotation of the carrier beam with respect to the airfoil body and that are configured to cause the flap to be rotated with respect to the carrier beam.

The first plurality of links of an example embodiment of the airfoil includes a four-bar linkage. In an example embodiment, the first plurality of links additionally includes a carrier beam scissors mechanism extending from a hinge point at which the carrier beam is hingedly connected to the airfoil body to a pivot point at which at least two links of the four-bar linkage are pivotally connected. In an example embodiment, the first plurality of links further includes an actuation linkage that includes at least two pivotally connected links extending from the actuator to a pivot point at which at least two links of the carrier beam scissors mechanism are pivotally connected.

The flap mechanism of an example embodiment of the airfoil is configured to alternately position the flap in an undeployed position and in a deployed position. In this example embodiment, a majority of the first plurality of links is disposed within the internal cavity in an instance in which the flap is in the undeployed position. The first plurality of links of an example embodiment is configured such that the actuator is unloaded in both the undeployed position and in the deployed position.

In another example embodiment, a flap mechanism is provided that includes a carrier beam configured to be hingedly connected to an airfoil body and also configured to be pivotally connected to a flap proximate the trailing edge of the airfoil body. The flap mechanism further includes an actuator, a first plurality of links and a second plurality of links, such as a scissors mechanism. The first plurality of links is operably connected to the airfoil body, the actuator and the carrier beam. The first plurality of links is configured to cause the carrier beam to be rotated with respect to the airfoil body in response to actuation by the actuator. The second plurality of links is responsive to rotation of the carrier beam with respect to the airfoil body. The second plurality of links is configured to cause the flap to be rotated with respect to the carrier beam.

The first plurality of links of an example embodiment of the flap mechanism includes a four-bar linkage. In an example embodiment, the first plurality of links additionally includes a carrier beam scissors mechanism extending from a hinge point at which the carrier beam is hingedly connected to the airfoil body to a pivot point at which at least two links of the four-bar linkage are pivotally connected. In an example embodiment, the first plurality of links further includes an actuation linkage that includes at least two pivotally connected links extending from the actuator to a pivot point at which at least two links of the carrier beam scissors mechanism are pivotally connected.

The flap mechanism of an example embodiment is configured to alternately position the flap in an undeployed position and in a deployed position. In this example embodiment, a majority of the first plurality of links is disposed within the internal cavity in an instance in which the flap is in the undeployed position. The first plurality of links of an example embodiment is configured such that the actuator is unloaded in both the undeployed position and in the deployed position.

In a further example embodiment, a method of actuating a flap proximate a trailing edge of an airfoil body is provided. The method of this example embodiment includes actuating a first plurality of links. The first plurality of links is operably connected to the airfoil body, an actuator and a carrier beam that is hingedly connected to the airfoil body. The first plurality of links is also hingedly connected to the flap. In this example embodiment, actuation of the first plurality of links includes causing the carrier beam to be rotated with respect to the airfoil body. The method of this example embodiment also includes causing, in response to the rotation of the carrier beam with respect to the airfoil body, the flap to be rotated with respect to the carrier beam of the second plurality of links.

In an embodiment in which the first plurality of links include a four-bar linkage, actuation of the first plurality of links includes causing a link operably connected to an intermediate portion of the carrier beam to be moved in a manner that causes the carrier beam to be rotated with respect to the airfoil body. In an embodiment in which the first plurality of links additionally includes a carrier beam scissors mechanism extending from a hinge point at which the carrier beam is hingedly connected to the airfoil body to a pivot point at which at least two links of the four-bar linkage are pivotally connected, actuation of the first plurality of links includes causing the carrier beam scissors mechanism to fold as the link operably connected to the intermediate portion of the carrier beam is caused to be moved. In a further example embodiment in which the first plurality of links additionally includes an actuation linkage including at least two pivotally connected links extending from the actuator to a pivot point at which at least two links of the carrier beam scissors mechanism are pivotally connected, actuation of the first plurality of links includes causing the actuation linkage to at least partially straighten in response to actuation by the actuator.

In an example embodiment in which the second plurality of links include a scissors mechanism, the method causes the flap to be rotated by causing the scissors mechanism to be at least partially unfolded. In an example embodiment, actuation of the first plurality of links causes the flap to move from an undeployed position to a deployed position. In this example embodiment, the first plurality of links is configured such that the actuator is unloaded in both the undeployed position and in the deployed position.

BRIEF DESCRIPTION OF THE DRAWINGS

Having thus described certain example embodiments of the present disclosure in general terms, reference will hereinafter be made to the accompanying drawings which are not necessarily drawn to scale, and wherein:

DETAILED DESCRIPTION

The present disclosure now will be described more fully hereinafter with reference to the accompanying drawings, in which some, but not all aspects are shown. Indeed, the disclosure may be embodied in many different forms and should not be construed as limited to the aspects set forth herein. Rather, these aspects are provided so that this disclosure will satisfy applicable legal requirements. Like numbers refer to like elements throughout.

An airfoil, a flap mechanism and an associated method are provided in accordance with an example embodiment of the present disclosure in order to controllably actuate a flap proximate a trailing edge of the airfoil. Airfoils that incorporate flap mechanisms and associated methods of example embodiments of the present disclosure may be carried by a wide variety of vehicles or other structures that may be utilized for various purposes. By way of example, but not of limitation, however, an airfoil embodied as a wing is described hereinafter.

Figure 1:
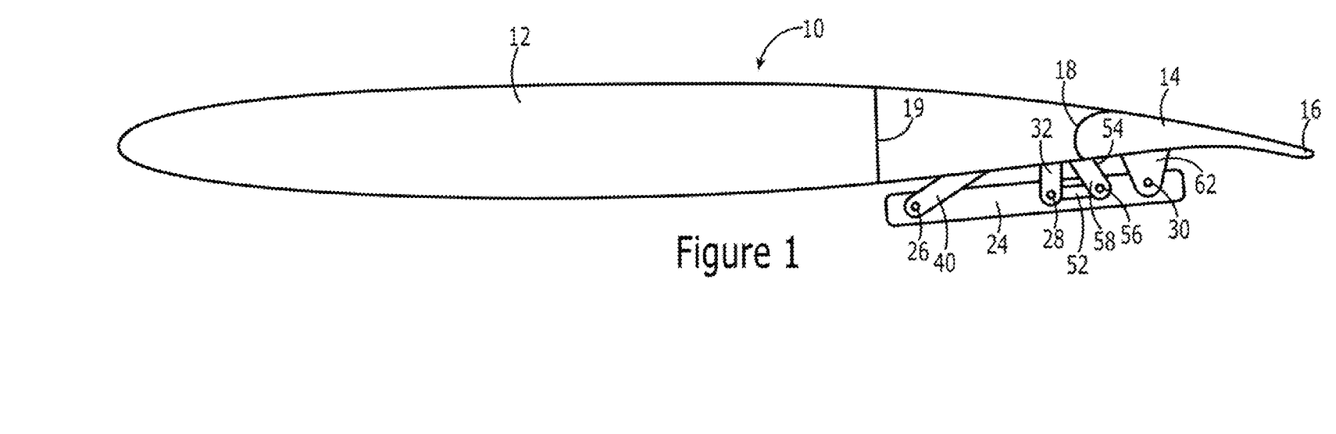
FIG. 1 is a side view of an airfoil including an airfoil body and a flap proximate the trailing edge of the airfoil body in accordance with an example embodiment of the present disclosure.

In this regard, FIG. 1 depicts a side view of a wing 10, such as a wing that may extend outwardly from the fuselage of an aircraft. The wing of this example embodiment includes an airfoil body 12 and one or more flaps 14 positioned proximate the trailing edge 16 of the airfoil body. As described below, the flap is configured to be repositioned, such as from an undeployed position as shown in FIG. 1 to a deployed position as described below. For example, the flap may be positioned in the undeployed position during the cruise phase of a flight, and in a deployed position during the takeoff and/or landing phases of a flight. As shown in FIG. 1, the flap, in an undeployed position, is positioned such that the upper and lower surfaces of the flap continue the profile defined by the airfoil body in a relatively smooth and continuous manner. As described below, in the deployed position, the flap is repositioned to be at an angle relative to the airfoil body with the trailing edge of the flap extending downwardly relative to the airfoil body.

The airfoil body 12 defines an internal cavity. For example, the airfoil body may include a plurality of ribs and a skin that is operably attached to and covers the ribs. As such, the airfoil body may define one or more internal cavities between the ribs. In order to improve the performance of the airfoil, at least a portion of the flap mechanism, such as a majority of the flap mechanism in an instance in which the flap 14 is in an undeployed position, may be disposed within the internal cavity defined by the airfoil body so as not to extend beyond the airfoil body in such a manner as to adversely affect the airflow thereover.

The airfoil also includes a flap mechanism configured to controllably position the flap 14 relative the airfoil body 12. As noted above, the flap mechanism is configured to position the flap in an undeployed position, such as during the cruise phase of a flight. Additionally, the flap mechanism is configured to position the flap in a deployed position, such as during the takeoff and/or landing phases of a flight.

Figure 2:
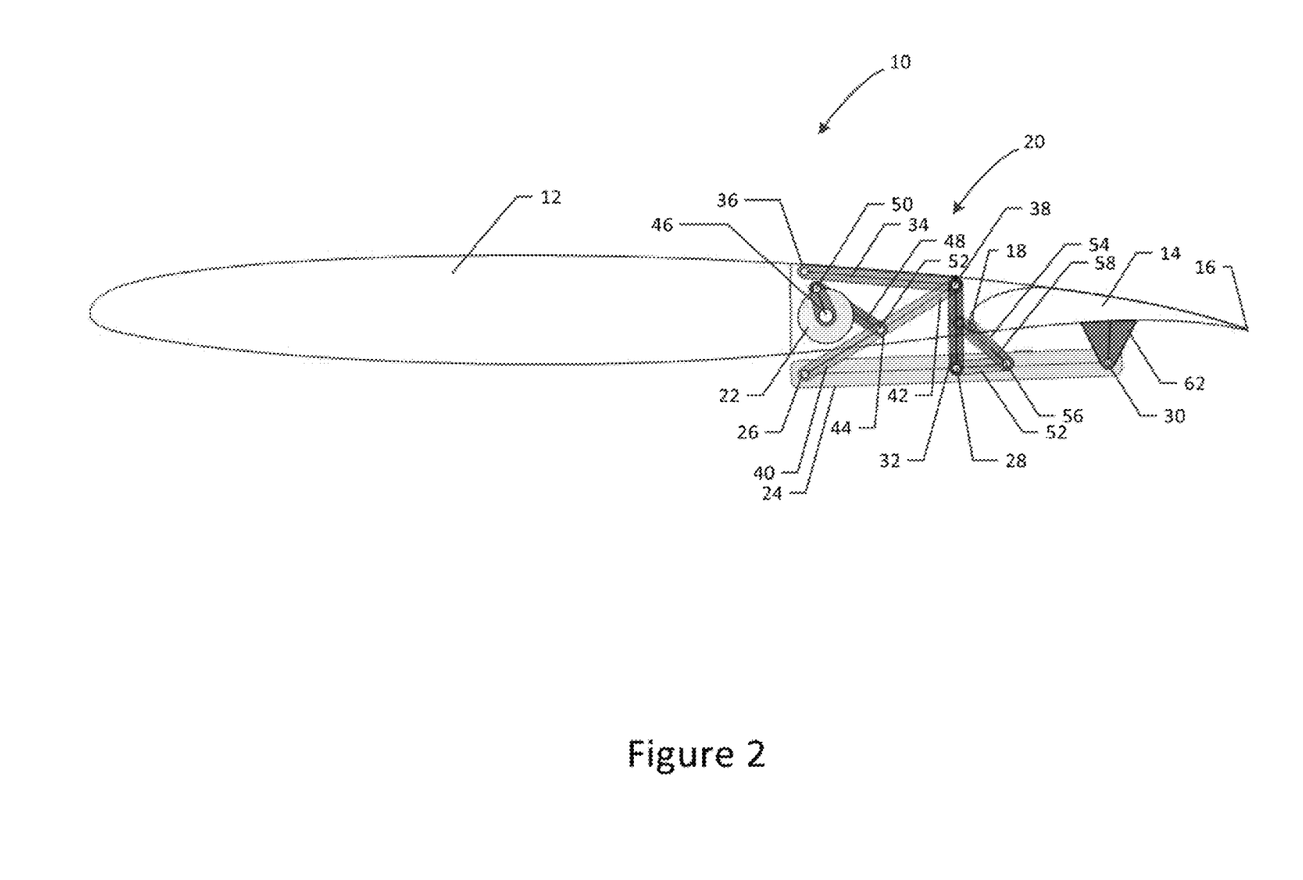
FIG. 2 is a schematic representation of a flap mechanism of an example embodiment of the present disclosure in an undeployed position.

Referring now to FIG. 2 in which the airfoil is embodied as a wing 10, the airfoil also includes a flap mechanism 20. The flap mechanism is configured to controllably position the flap 14 relative to the airfoil body 12. As shown in FIG. 2, the flap mechanism maintains the flap in an undeployed position such that the upper and lower surfaces of the flap generally continue the upper and lower surfaces, respectively, of the airfoil body in a relatively smooth and continuous manner. The flap mechanism includes an actuator 22. The actuator is responsive in the illustrated embodiment to instructions or other input signals, such as from a flight control computer, a pilot or the like. As described below, the actuator is configured to provide actuation force to the links that comprise the remainder of the flap mechanism in order to controllably position the links of the flap mechanism and, in turn, the flap of the airfoil, such as alternately in the deployed and undeployed positions. The actuator may be embodied in various manners. For example, in the illustrated embodiment, the actuator is a rotary actuator. However, the actuator may be embodied in different manners in other embodiments.

The flap mechanism 20 of this example embodiment also includes a carrier beam 24. The carrier beam is generally positioned under wing. The carrier wing is hingedly connected to the airfoil body 12 and is also pivotally connected to the flap 14. In this example embodiment, the carrier beam extends in a longitudinal direction from a first end at which the carrier beam is hingedly connected to the airfoil body to a second, opposed end at which the carrier beam is pivotally connected to the flap. Although the carrier beam may be sized and shaped in different manners, the carrier beam of an example embodiment has a thickness or depth of about 8 inches so as to limit the extent that the flap mechanism protrudes beyond the airfoil and interrupts the airflow thereover.

The flap mechanism 20 also includes a first plurality of links operably connected to the airfoil body 12, the actuator 22 and a carrier beam 24. As described below, the first plurality of links are configured to cause the carrier beam to be rotated with respect to the airfoil body in response to actuation by the actuator. In this regard, the repositioning of the first plurality of links in response to actuation by the actuator generally controls the vertical position of the carrier beam and, in turn, the vertical position of the flap 14 relative to the airfoil body.

Figure 3:
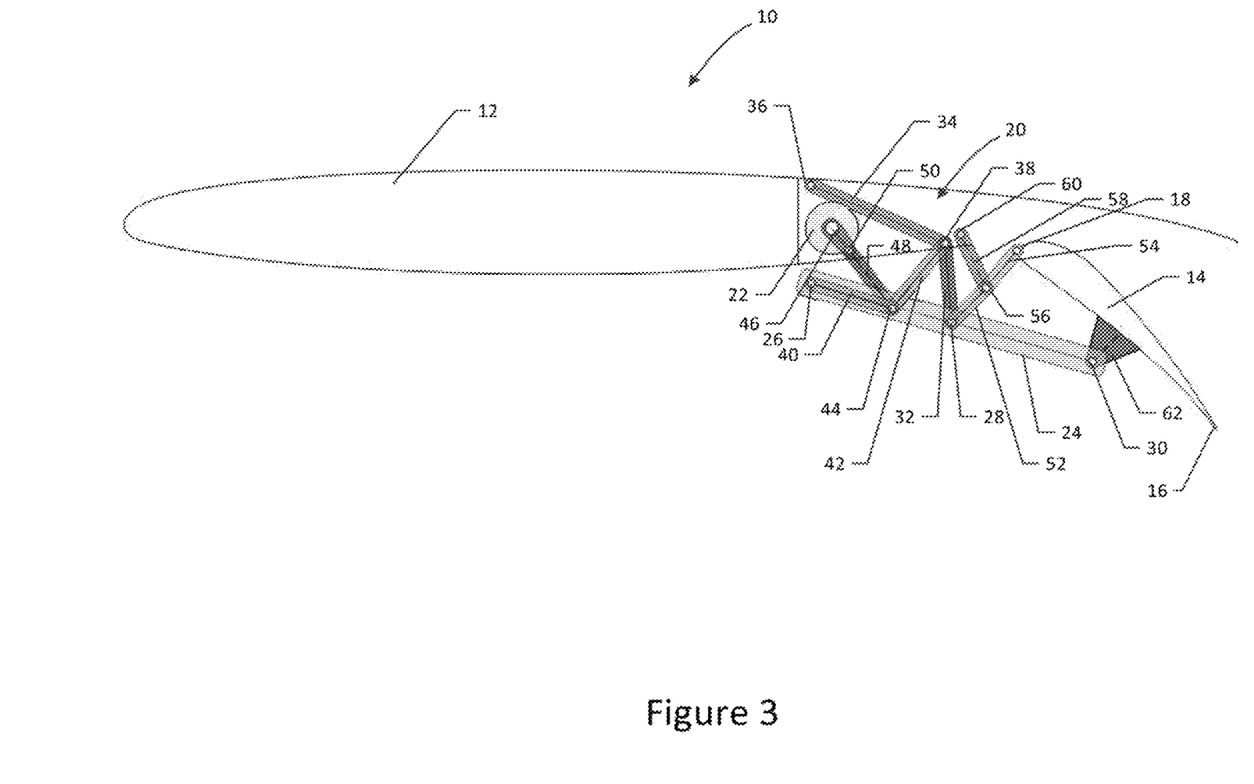
FIG. 3 is a schematic representation of the flap mechanism of FIG. 2 in a deployed position.
Figure 4:
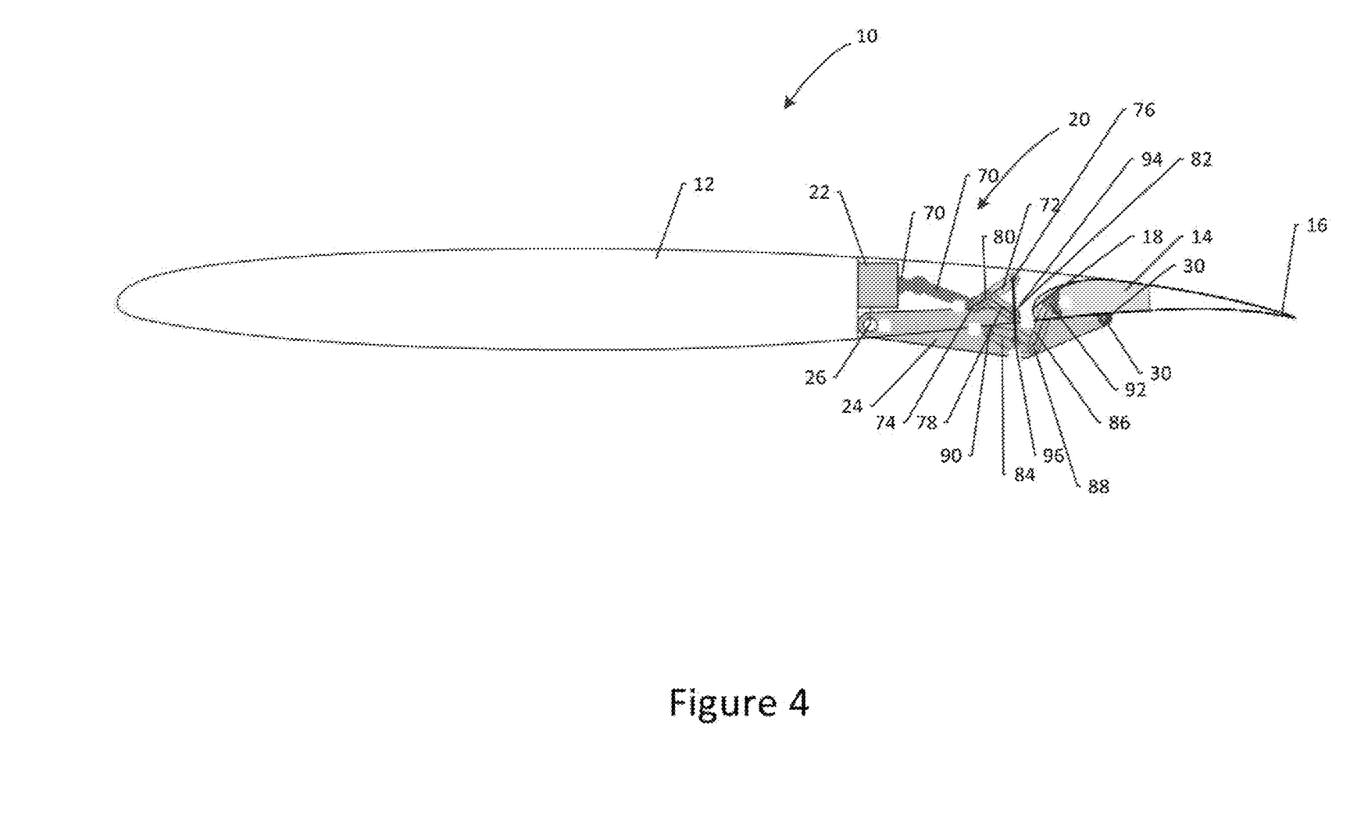
FIG. 4 is a schematic representation of a flap mechanism of another example embodiment of the present disclosure in an undeployed position.
Figure 5:
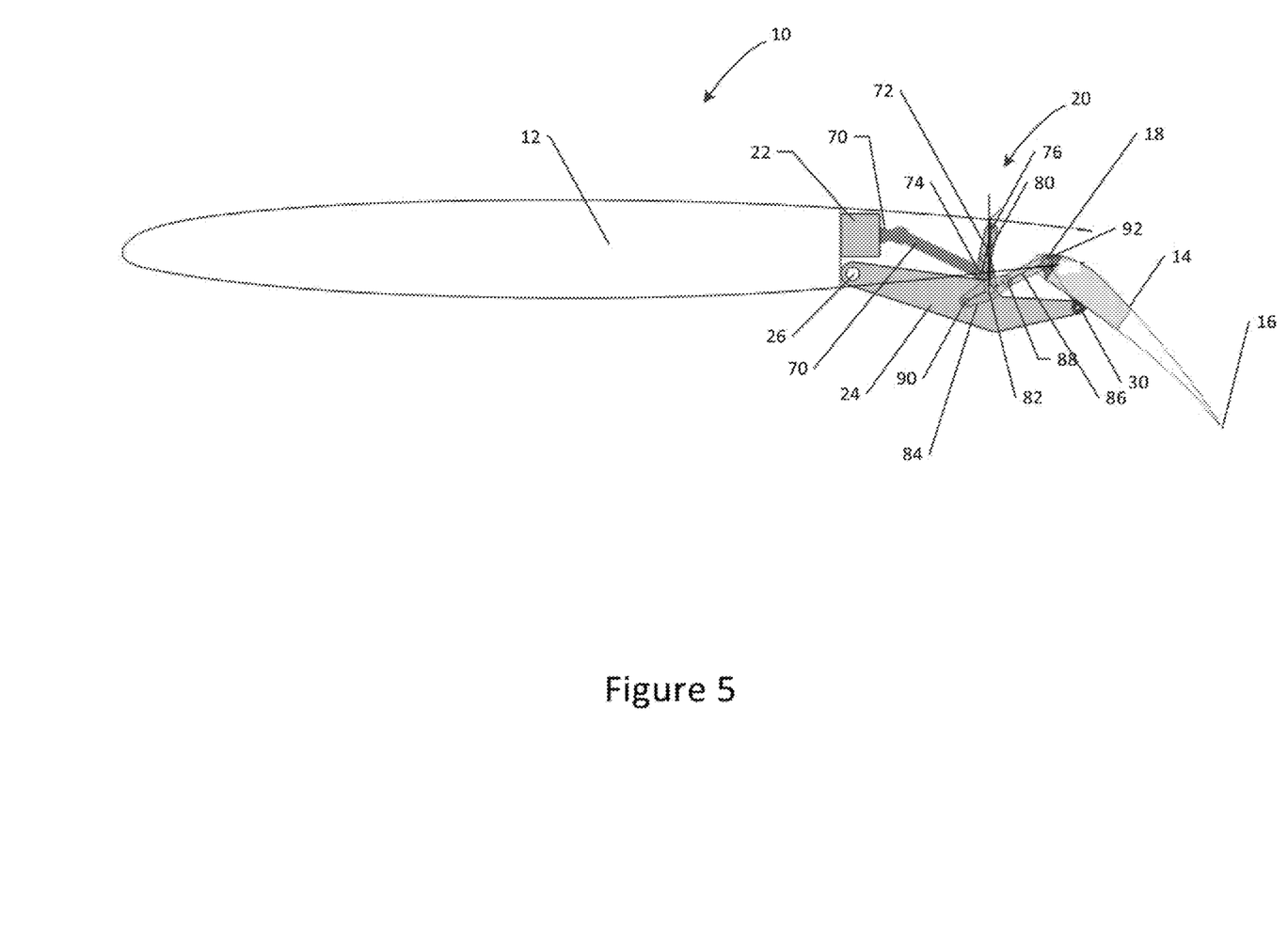
FIG. 5 is a schematic representation of the flap mechanism of FIG. 4 in a deployed position.
Figure 6:
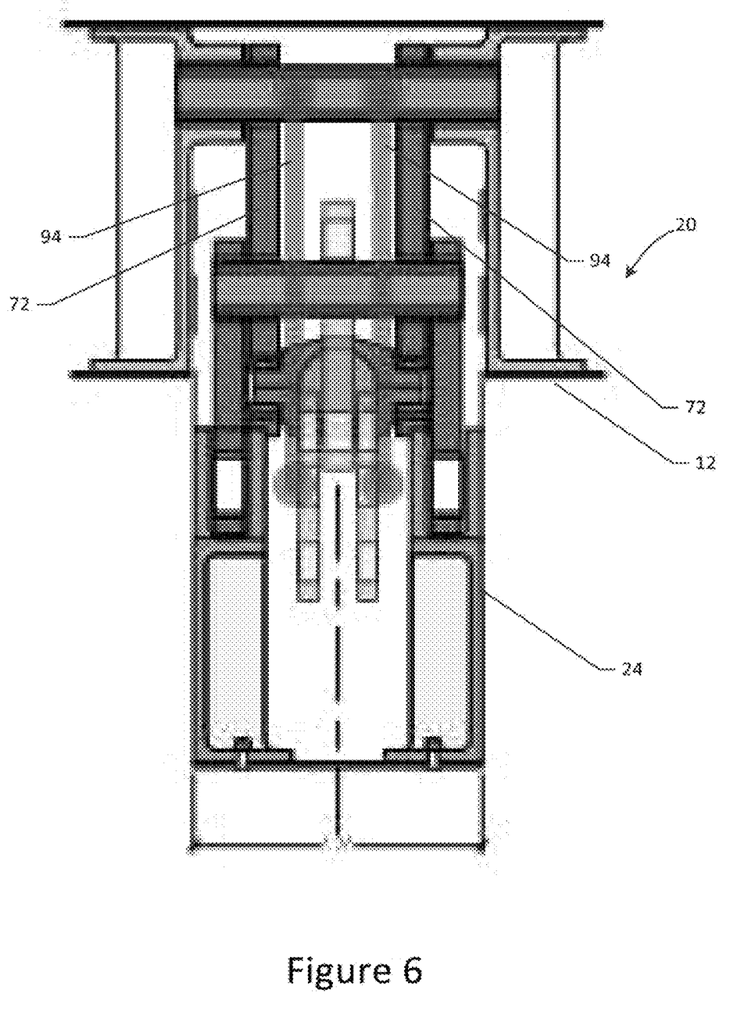
FIG. 6 is a cross-sectional view of the flap mechanism of FIGS. 4 and 5 taken along line 6-6 of FIG. 5.

The first plurality of links may be configured in various manners. In this regard, the embodiment of FIGS. 2 and 3 depict one example embodiment of the first plurality of links, while FIGS. 4-6 depict another example embodiment of the first plurality of links. However, the first plurality of links may be embodied in yet other manners if so desired. With respect to the example embodiment of FIGS. 2 and 3, however, the first plurality of links include a four-bar linkage. In this regard, the four-bar linkage includes a portion of the carrier beam 24 that extends from the hinge point 26 at which the carrier beam is hingedly connected to the airfoil body 12 to an intermediate point 28 between the hinge point 26 and the pivot point 30 at which the carrier beam is pivotally connected to the flap 14. The four-bar linkage of the illustrated embodiment also includes a link 32 that is pivotally connected to the carrier beam at the intermediate point 28, link 34 that extends from a hinge point 36 at which link 34 is hingedly connected to the airfoil body to a pivot point 38 at which link 34 is pivotally connected to link 32 and the portion of the airfoil body that extends from hinge point 36 to hinge point 26, such as the rear spar 19 or other fitting of the airfoil body. It will be noted that the four-bar linkage is hingedly attached to the airfoil body, such as the hinge points 26 and 36, but includes portions that are configured to be controllably move relative to the airfoil body in response to actuation.

In order to controllably position the four-bar linkage, the first plurality of links of the example embodiment of FIG. 2 also includes a carrier beam scissors mechanism. The carrier beam scissors mechanism includes at least two links pivotally connected to one another and configured for scissors movement that causes the at least two links to alternately at least partially open and at least partially close. The carrier beam scissors mechanism includes links 40, 42 that extend from the hinge point 26 at which the carrier beam 24 is hingedly connected to the airfoil body 12 to the pivot point 38 at which at least two links of the four-bar linkage, such as links 32 and 34, are pivotally connected to one another. As shown in FIG. 2, the links 40, 42 of the carrier beam scissors mechanism are also pivotally connected to one another at an intermediate pivot point 44 between the hinge point 26 at which the carrier beam is hingedly connected to the airfoil body and the pivot point 38 at which links 40 and 42 are pivotally connected to one another.

In order to controllably position the carrier beam scissors mechanism so as to controllably position the four-bar linkage and, in turn, to position the carrier beam 24 and the flap 14 pivotally attached thereto, the first plurality of links of this example embodiment also includes an actuation linkage including at least two pivotally connected links 46, 48 extending from the actuator 22 to the pivot point 44 at which the links 40, 42 of the carrier beam scissors mechanism are pivotally connected to one another. The links 46, 48 of the actuation linkage are pivotally connected at pivot point 50. As shown in FIG. 2, in an instance in which the flap is to be positioned in the undeployed position, such as during the cruise phase of a flight, the links 46, 48 of the actuation link are generally folded such that the pivot point 44 at which the links 40, 42 of the carrier beam scissors mechanism are pivotally attached is drawn into the interior cavity defined by the airfoil body 12 and the carrier beam scissors mechanism is fully opened such that the links 40, 42 of the carrier beam scissors mechanism extend in a linear manner. As a result of the positioning of the carrier beam scissors mechanism so as to extend in a linear manner, the four-bar linkage is also moved to the position shown in FIG. 2 in which a majority of the first plurality of links is disposed within the internal cavity while the flap is in the undeployed position.

However, in an instance in which the flap 14 is to be positioned in the deployed position, such as during the takeoff and/or landing phases of the flight, the actuator 22 causes the actuation linkage to be repositioned. In the illustrated embodiment in which the actuator is a rotary actuator, the rotary actuator is rotated so as to place the links 46, 48 of the actuation linkage in a fully opened position in which the links are aligned linearly as shown in FIG. 3. As a result, the actuation linkage causes the carrier beam scissors mechanism to be at least partially folded with the pivot point 44 at which the links 40, 42 of the carrier beam scissors mechanism are pivotally connected to one another being driven beyond the interior cavity defined by the airfoil body 12 and into general alignment with the carrier beam 24 under wing. The repositioning of the carrier beam scissors mechanism as a result of the lengthening of the actuation linkage correspondingly causes at least a portion of the four-bar linkage and the carrier beam connected thereto to be rotated downwardly relative to the airfoil body such that a greater percentage of the first plurality of links are under wing in the deployed position than in the undeployed position.

In addition to the first plurality of links, the flap mechanism 20 also includes a second plurality of links. The second plurality of links is responsive to rotation of the carrier beam 24 with respect to the airfoil body 12. The second plurality of links is also configured to cause the flap 14 to be rotated with respect to the carrier beam in response to the rotation of the carrier beam with respect to the airfoil body. In this regard, the second plurality of links are configured to control the rotation of the flap such that the trailing edge 16 of the flap is rotated in a downwardly direction relative to the airfoil body as the flap transitions from the undeployed position of FIG. 2 to the deployed position of FIG. 3.

The second plurality of links of an example embodiment includes a scissors mechanism. The scissors mechanism includes at least two links 52, 54 configured to be controllably folded and unfolded in response to rotation of the carrier beam 24 with respect to the airfoil body 12 so as to correspondingly control the rotation of flap 14 with respect to the carrier beam. In the illustrated embodiment, the scissors mechanism includes a pair of links 52 and 54 that are pivotally connected to one another at pivot point 56. As shown, link 52 is pivotally connected to the intermediate point 28 of the carrier beam at which link 32 is also pivotally connected to the carrier beam. Further, link 54 is pivotally connected to the flap, such as to the leading edge 18 of the flap. In the undeployed position, the scissors mechanism of the second plurality of links is at least partially folded, while in the deployed position, the scissors mechanism of the second plurality of links is at least partially unfolded and, in an example embodiment, is fully unfolded such that the links of the scissors mechanism are disposed in a linear relationship.

The second plurality of links of the illustrated embodiment also includes a link 58 that extends from the pivot point 56 at which the links 52, 54 of the scissors mechanism are pivotally connected to one another to pivot point 60 at which link 58 is pivotally connected to the airfoil body 12. As shown in FIG. 2, in the undeployed position, the scissors mechanism is at least partially folded. However, as the carrier beam 24 is rotated downwardly away from the airfoil body in response to actuation by the actuator 22, the scissors mechanism of the second plurality of links is caused to at least partially open, thereby causing the leading edge of the flap 14 to be moved rearwardly. In combination with the downward movement of the pivot point 30 at which the carrier beam is pivotally connected to the flap, or a fitting 62 carried by the flap, the flap angle relative to the airfoil body is automatically increased as the flap is deployed as shown in FIG. 3 such that the trailing edge 16 of the flap is rotated downwardly relative to the airfoil body.

As noted above, the flap mechanism 20 protrudes beyond the airfoil, such as by protruding under wing, albeit to a much lesser degree than other flap support mechanisms. Thus, the airfoil including a flap mechanism of an example embodiment of the present disclosure facilitates efficient airflow thereover and enhances the aerodynamic performance of the airfoil. In an instance in which the portion of the flap mechanism that protrudes under wing is housed by a fairing, the fairing correspondingly does not extend beyond the airfoil as greatly as the fairings that house other flap support mechanisms. Additionally, the flap mechanism of the example embodiment of FIGS. 2 and 3 is designed such that the actuator 22 is unloaded, that is, not subjected to loads, in both the undeployed position as shown in FIG. 2 and in the fully deployed position as shown in FIG. 3. As a result of being unloaded in both the undeployed and deployed positions, the operational lifetime of the actuator may be extended. Additionally, the links of the first and second plurality of links are primarily two force members and the majority of the load pads are dualized.

As noted above, the flap mechanism may be configured in various manners. As such, an alternative embodiment of the flap mechanism is depicted in FIGS. 4-6. The flap mechanism 20 of this example embodiment also includes an actuator 22, a carrier beam 24 and first and second pluralities of links as described above. However, the first and second plurality of links of this example embodiment are differently configured than those described above in conjunction with the embodiment of FIGS. 2 and 3.

In addition to the actuation linkage 70, the first plurality of links includes a pair of links, namely, a first link 72 extending from a pivot point 74 at which the first link is pivotally connected to the actuation linkage to a pivot point 76 at which the first link is pivotally connected to the airfoil body 12 and a second link 78 extending from a pivot point 80 at which the second link is pivotally connected to an intermediate portion of the first link and a pivot point 82 at which the second link is pivotally connected to an intermediate portion of the carrier beam 24. The first and second links are configured in response to actuation by the actuation linkage to move in a scissors-like manner between an at least partially closed position as shown in FIG. 4 in which the flap 14 is positioned in an undeployed position to an at least partially open position in which the first and second links are more closely aligned in a linear manner as shown in FIG. 5. As also shown in FIG. 5, the actuation of the first and second links causes the carrier beam to be rotated downwardly relative to the airfoil body.

The flap mechanism 20 of the example embodiment of FIGS. 4-6 also includes a second plurality of links. The second plurality of links includes a scissors mechanism that is formed of a pair of links 84, 86 that are pivotally connected to one another at pivot point 88 and that is configured to be at least partially folded in the undeployed position as shown in FIG. 4 and to be opened such that the links 84, 86 of the scissors mechanism are disposed in a linear relationship as shown in FIG. 5 in the deployed position. More particularly, the links of the scissors mechanism include a first scissors mechanism link 84 that extends from a pivot point 90 at which the first scissors mechanism link 84 is pivotally connected to the carrier beam 24 to the pivot point 88. Additionally, the links of the scissors mechanism include a second scissors mechanism link 86 that extends from the pivot point 88 to a pivot point 92 at which the second scissors mechanism link 86 is pivotally connected to the flap 14, such as a leading edge 18 of the flap. The second plurality of links also includes a link 94 that extends from the pivot point 76 at which the first link 72 of the first plurality of links is pivotally connected to the airfoil body 12 to a pivot point 96 at which the link is pivotally connected to the first scissors mechanism link 84.

In response to actuation of the first plurality of links, the scissors mechanism of the second plurality of links is caused to open which causes the leading edge 18 of the flap 14 to move aftward. This movement, in combination with the downward movement of the pivot point 30 at which the carrier beam 24 is pivotally connected to the flap or a fitting operably connected to the flap, causes the flap to be deflected such that the trailing edge 16 of the flap is moved in a downward direction relative to the airfoil body 12. Further details of this embodiment of the flap mechanism 20 is provided by FIG. 6 which is taken along As described above in conjunction with the example embodiment of FIGS. 2 and 3, the flap mechanism 20 of the example embodiment of FIGS. 4-6 is configured to be at least partially disposed within the internal cavity defined by the airfoil body 12 such that the portion of the flap mechanism that extends beyond the airfoil body, such as under wing, is less than other flap support mechanisms, thereby facilitating airflow over the airfoil and improving the aerodynamic performance of the airfoil. In this regard, FIG. 6 taken along line 6-6 of FIG. 5 depicts a portion of the flap mechanism disposed within the internal cavity defined by the airfoil body even in an instance in which the flap 14 has been deployed.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

That which is claimed:

1. An airfoil comprising:
   an airfoil body defining an internal cavity;
   a flap proximate a trailing edge of the airfoil body; and
   a flap mechanism configured to controllably position the flap relative to the airfoil body, wherein the flap mechanism comprises:
   a carrier beam hingedly connected to the airfoil body at a hinge point such that the carrier beam is configured to rotate about the hinge point relative to the airfoil body without aftward movement during a transition between an undeployed position and a deployed position, the carrier beam also pivotally connected to the flap;
   an actuator disposed within the internal cavity;
   a first plurality of links operably connected to the airfoil body, the actuator and the carrier beam, the first plurality of links being configured to cause the carrier beam to be rotated with respect to the airfoil body in response to actuation by the actuator, wherein the first plurality of links comprise a carrier beam scissors mechanism connected to the carrier beam and configured to be folded to a different extent during the transition between the undeployed position and the deployed position; and
   a second plurality of links that are responsive to rotation of the carrier beam with respect to the airfoil body and that are configured to cause the flap to be rotated with respect to the carrier beam.

2. An airfoil according to claim 1 wherein the first plurality of links further comprise a four-bar linkage.

3. An airfoil according to claim 2 wherein the carrier beam scissors mechanism extends from the hinge point at which the carrier beam is hingedly connected to the airfoil body to a pivot point at which at least two links of the four-bar linkage are pivotally connected.

4. An airfoil according to claim 3 wherein the first plurality of links further comprise an actuation linkage comprising at least two pivotally connected links extending from the actuator to a pivot point at which at least two links of the carrier beam scissors mechanism are pivotally connected.

5. An airfoil according to claim 1 wherein the second plurality of links comprise a scissors mechanism.

6. An airfoil according to claim 1 wherein the flap mechanism is configured to alternately position the flap in the undeployed position and in the deployed position, and wherein a majority of the first plurality of links is disposed within the internal cavity in an instance in which the flap is in the undeployed position.

7. An airfoil according to claim 1 wherein the flap mechanism is configured to alternately position the flap in the undeployed position and in the deployed position, and wherein the first plurality of links are configured such that the actuator is unloaded in both the undeployed position and in the deployed position.

8. A flap mechanism comprising:
   a carrier beam configured to be hingedly connected to an airfoil body at a hinge point such that the carrier beam is configured to rotate about the hinge point relative to the airfoil body without aftward movement during a transition between an undeployed position and a deployed position, the carrier beam also configured to be pivotally connected to a flap proximate a trailing edge of the airfoil body;
   an actuator;
   a first plurality of links operably connected to the airfoil body, the actuator and the carrier beam, the first plurality of links being configured to cause the carrier beam to be rotated with respect to the airfoil body in response to actuation by the actuator, wherein the first plurality of links comprise a carrier beam scissors mechanism connected to the carrier beam and configured to be folded to a different extent during the transition between the undeployed position and the deployed position; and
   a second plurality of links that are responsive to rotation of the carrier beam with respect to the airfoil body and that are configured to cause the flap to be rotated with respect to the carrier beam.

9. A flap mechanism according to claim 8 wherein the first plurality of links further comprise a four-bar linkage.

10. A flap mechanism according to claim 9 wherein the carrier beam scissors mechanism extends from the hinge point at which the carrier beam is hingedly connected to the airfoil body to a pivot point at which at least two links of the four-bar linkage are pivotally connected.

11. A flap mechanism according to claim 10 wherein the first plurality of links further comprise an actuation linkage comprising at least two pivotally connected links extending from the actuator to a pivot point at which at least two links of the carrier beam scissors mechanism are pivotally connected.

12. A flap mechanism according to claim 8 wherein the second plurality of links comprise a scissors mechanism.

13. A flap mechanism according to claim 8 wherein the flap mechanism is configured to alternately position the flap in the undeployed position and in the deployed position, and wherein a majority of the first plurality of links are configured to be disposed within an internal cavity defined by the airfoil body in an instance in which the flap is in the undeployed position.

14. A flap mechanism according to claim 8 wherein the flap mechanism is configured to alternately position the flap in the undeployed position and in the deployed position, and wherein the first plurality of links are configured such that the actuator is unloaded in both the undeployed position and in the deployed position.

15. A method of actuating a flap proximate a trailing edge of an airfoil body, the method comprising:
 actuating a first plurality of links, wherein the first plurality of links are operably connected to the airfoil body, an actuator and a carrier beam that is hingedly connected to the airfoil body at a hinge point and also hingedly connected to the flap, wherein actuating the first plurality of links comprises causing the carrier beam to be rotated about the hinge point with respect to the airfoil body without aftward movement during a transition between an undeployed position and a deployed position, wherein the first plurality of links comprise a carrier beam scissors mechanism connected to the carrier beam, and wherein actuating the first plurality of links further comprises causing the carrier beam scissors mechanism to be folded to a different extent during the transition between the undeployed position and the deployed position; and
 in response to rotation of the carrier beam with respect to the airfoil body, causing the flap to be rotated with respect to the carrier beam with a second plurality of links.

16. A method according to claim 15 wherein the first plurality of links further comprise a four-bar linkage, and wherein actuating the first plurality of links further comprises causing a link operably connected to an intermediate portion of the carrier beam to be moved in a manner that causes the carrier beam to be rotated with respect to the airfoil body.

17. A method according to claim 16 wherein the carrier beam scissors mechanism extends from the hinge point at which the carrier beam is hingedly connected to the airfoil body to a pivot point at which at least two links of the four-bar linkage are pivotally connected, and wherein actuating the first plurality of links further comprises causing the carrier beam scissors mechanism to fold as the link operably connected to the intermediate portion of the carrier beam is caused to be moved.

18. A method according to claim 17 wherein the first plurality of links further comprise an actuation linkage comprising at least two pivotally connected links extending from the actuator to a pivot point at which at least two links of the carrier beam scissors mechanism are pivotally connected, and wherein actuating the first plurality of links comprises causing the actuation linkage to at least partially straighten in response to actuation by the actuator.

19. A method according to claim 15 wherein the second plurality of links comprise a scissors mechanism, and wherein causing the flap to be rotated comprises causing the scissors mechanism to be at least partially unfolded.

20. A method according to claim 15 wherein actuating the first plurality of links causes the flap to move from the undeployed position to the deployed position, and wherein the first plurality of links are configured such that the actuator is unloaded in both the undeployed position and in the deployed position.

* * * * *